(12) United States Patent
Rich et al.

(10) Patent No.: US 7,698,406 B2
(45) Date of Patent: Apr. 13, 2010

(54) METHOD AND APPARATUS FOR IDENTIFYING AND CLASSIFYING NETWORK-BASED DISTRIBUTED APPLICATIONS

(75) Inventors: Charles R. Rich, Northport, NY (US); Nelson S. Ferreira, New Rochelle, NY (US); Stephen H. Gomory, Tarrytown, NY (US)

(73) Assignee: EMC Corporation, Hopkinton, MA (US)

( * ) Notice: Subject to any disclaimer, the term of this patent is extended or adjusted under 35 U.S.C. 154(b) by 1053 days.

(21) Appl. No.: 11/054,577

(22) Filed: Feb. 9, 2005

(65) Prior Publication Data
US 2006/0069801 A1 Mar. 30, 2006

Related U.S. Application Data (60) Provisional application No. 60/604,330, filed on Aug. 25, 2004.

(51) Int. Cl.
G06F 15/16 (2006.01)
G06F 15/173 (2006.01)
G06F 3/00 (2006.01)

(52) U.S. Cl. .......... 709/223; 709/202; 719/317
(58) Field of Classification Search ........ 709/202, 709/223; 719/317
See application file for complete search history.

(56) References Cited

U.S. PATENT DOCUMENTS

2005/0102383 A1* 5/2005 Sutler .............. 709/223
2008/0244534 A1* 10/2008 Golender et al. ...... 717/128

* cited by examiner

Primary Examiner—Patrice Winder
Assistant Examiner—Tanim Hossain
(74) Attorney, Agent, or Firm—Krishnendu Gupta; Joseph D'Angelo (57) ABSTRACT

A method and apparatus for specifying the identification and classification of at least one application having components distributed over selected nodes of a network system is disclosed. The method comprises the steps of creating a first section containing at least one directive for specifying information or initiating at least one external process for discovering characteristics of the application, creating a second section containing at least one directive for specifying information or initiating at least one external process for storing the discovered characteristics, and creating a third section containing at least one directive for specifying information or initiating at least one external process for testing the discovered characteristics.

20 Claims, 12 Drawing Sheets

| appSignatureDefinition SCHEMA | | | |
|---|---|---|---|
| DETECTOR TYPE | PARAMETER | LABEL | VALUE |
| PROCESS | COMMAND | PROCESS NAME | Oraserv.exe |
| SERVICE | ServiceName | SERVICE NAME (W2K) | ORCL |
| TCPPORTS | PORT | TCP PORTS | 1521, 1810, 2481 |
| COMMAND LINE | ARGUMENTS | COMMAND LINE | C:\oracle9\bin\oradim |
| FILE | PATH | FILES | init.ora, tnsnames.ora |
| | | | |
| TOPOLOGY DESCRIPTION | | LABEL | VALUE |
| CLASS | | CLASS | DataBaseServer |
| INSTANCE | | INSTANCE NAME | ACCT-RECEIVER-DB |
| VendorAttribute | | VENDOR | ORACLE INT. CORP |
| DescriptionAttribute | | DESCRIPTION | RDBMS |
| MajorVersionAttribute | | MAJOR VER. | 9 |
| MinorVersionAttribute | | MINOR VER. | i |
| 12 | | | |
| MONITORING ACTION | PARAMETER | LANGUAGE | LABEL | VALUE |
| OraclePing | | PERL | HEALTH CHECK | OraclePing |
| | | | | |

METHOD AND APPARATUS FOR IDENTIFYING AND CLASSIFYING NETWORK-BASED DISTRIBUTED APPLICATIONS

CLAIM OF PRIORITY

This application claims the benefit, pursuant to 35 USC §119(e) to: U.S. Provisional Patent Application Ser. No. 60/604,330, entitled "Method and System for Identifying and Classifying Network-Based Applications," filed on Aug. 25, 2004, the contents of which are incorporated by reference herein.

This application is related to concurrently filed, commonly-owned U.S. patent application Ser. No. 11/054,578, entitled "Method an Apparatus for Discovering Distributed Applications."

BACKGROUND OF THE INVENTION

The use of computer networks has become an integral part of the way businesses provide goods and services to their customers. One advantage the use of the network provides is to enable the distribution of applications, and the business logic that they are comprised of, closer to the actual user or customer. This enables these businesses to offer higher levels of service to disparate groups of customers in a wider geographic area than ever before. This has also enabled businesses to allow customers access to the business network, albeit limited, for example, to directly track their purchases. In this case, each customer may have access to standardized or "tailored" application software packages or to custom developed software packages to perform desired operations.

However, as businesses and their customers take advantage of their networks and their networks expand, either in a planned manner or by the acquisition of other networks, the number of application packages may increase significantly. In some cases, the state of all the application packages, e.g., "running," "installed but non-running," and their locations may not be known or appreciated; particularly for those application packages that may be tailored or those that have narrow usage. In addition, enterprise applications, telecom services and other such services, need not be isolated entities existing on a single host, but rather may be distributed with dependent components present on multiple hosts within their enterprise and sometimes even spanning enterprises. In order to determine the existence of the applications and/or their state, it is often required to discover many of the distributed pieces or components and the relationships between them, i.e., the application's "topology," and further to make a determination whether the application has indeed been found. This is not a straightforward task as the variability in configuration and deployment options for these applications is high. For example, to discover simple processes that are running in a UNIX based system, a user may use a command line tool, e.g., an instruction, such as UNIX command "ps" to "dump the process table." This command line tool creates a list of processes executing on a specific host on the network. The list may then be filtered using the UNIX "grep" command line with known search criteria. This specific methodology is, of course, of limited value as it is unable to discover non-running applications and does not discover the applications topology (i.e., the relationships among distributed application components). More sophisticated tools, referred to as agents, may be built or created to probe still deeper into the components and their relationships. However, as in the prior example there is no knowledge of what the relationships among multiple processes are and only currently running processes may be discovered.

Thus, as the network expands it can become bloated with forgotten application packages that may have little or no usage, but are left in place as the consequence of their removal is unknown. On the other hand, leaving unused applications where they are installed may cause harm by consuming valuable disk space and/or if running also consuming valuable CPU cycles. Most importantly, there are critical applications that must be running with optimal performance for a business to service their customers and effectively run their operation.

Hence, there is a need in the industry for a method and system for discovering, classifying and testing (DCT) network-based application programs in order to maintain the company's business processes, the identified applications that run them and the networks that they are resident upon.

SUMMARY OF THE INVENTION

A method and apparatus for specifying the identification and classification of applications having components distributed over selected nodes of a network system is disclosed. The method comprises the steps of creating a first section containing at least one directive for specifying information or initiating at least one external process for discovering characteristics of the application, creating a second section containing at least one directive for specifying information or initiating at least one external process for storing the discovered characteristics, and creating a third section containing at least one directive for specifying information or initiating at least one external process for testing the discovered application characteristics. Hence, the application signature described provides instruction for external processes to discover and identify application characteristics and/or attributes that are distributed among the nodes of a network.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

Figure 1:
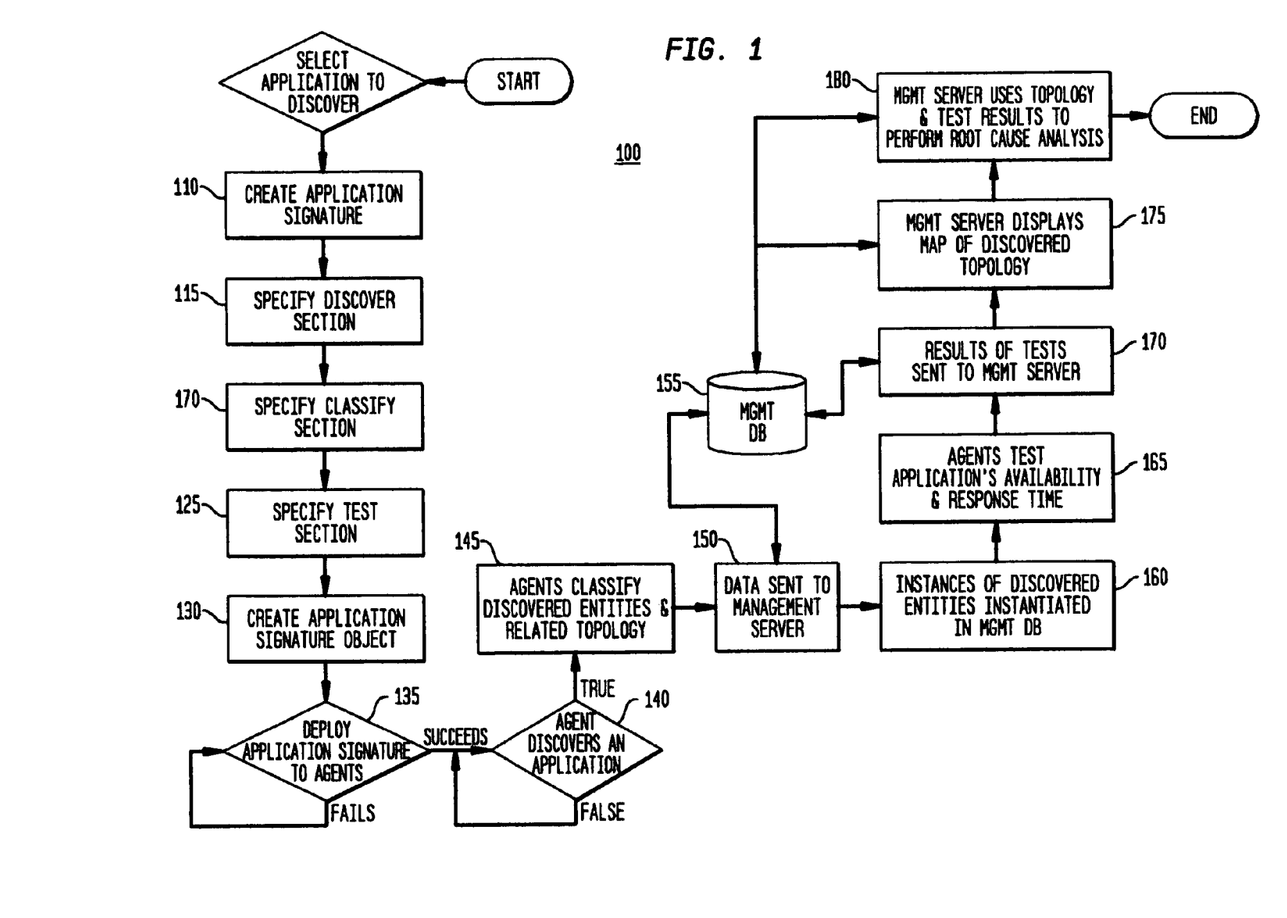
FIG. 1 illustrates a flow chart of an exemplary process for determining and deploying an application signature in accordance with the principles of the invention.

FIG. 1 illustrates a flow chart 100 specifying an exemplary process for creating and then deploying an Application signature. Further details regarding particular steps shown in FIG. 1 are presented with regard to FIGS. 2-5. FIG. 1 illustrates the steps for discovering, block 115, classifying, block 120, and testing, block 125, an application on a network.

In addition to the specification of the details for the three sections of discover, classify and test, the exemplary flow chart 100 further illustrates the usage of the created Application Signature object as a component of an application management solution. In this illustrative process, the Application Signature, once created as an object, block 130, is distributed, block 135, to a collection of programs referred to as Beacons, which are similar to the well-known concept of software Agents. However, Beacons are used primarily for the actualization or execution of the processes referred to in the Application Signature. Beacons (Agents) manage and control the management processes defined in one or more Application Signatures and communicate the results of these activities with a management server where the data is "safe-stored" in a network-available repository. The Beacon executes the processes defined in the Application Signature at a predetermined, or pre-established interval. Or the processes may be executed when commanded by an operator. The management server utilizing the results obtained from the Beacon's execution of the Application Signature to create visual representations of its discovery and classification in the form of application maps (topology). The results pertaining to the test section are used as input to the management servers' analysis process which will then be reflected in the form of the state of the application on the aforementioned application maps.

Figure 2:
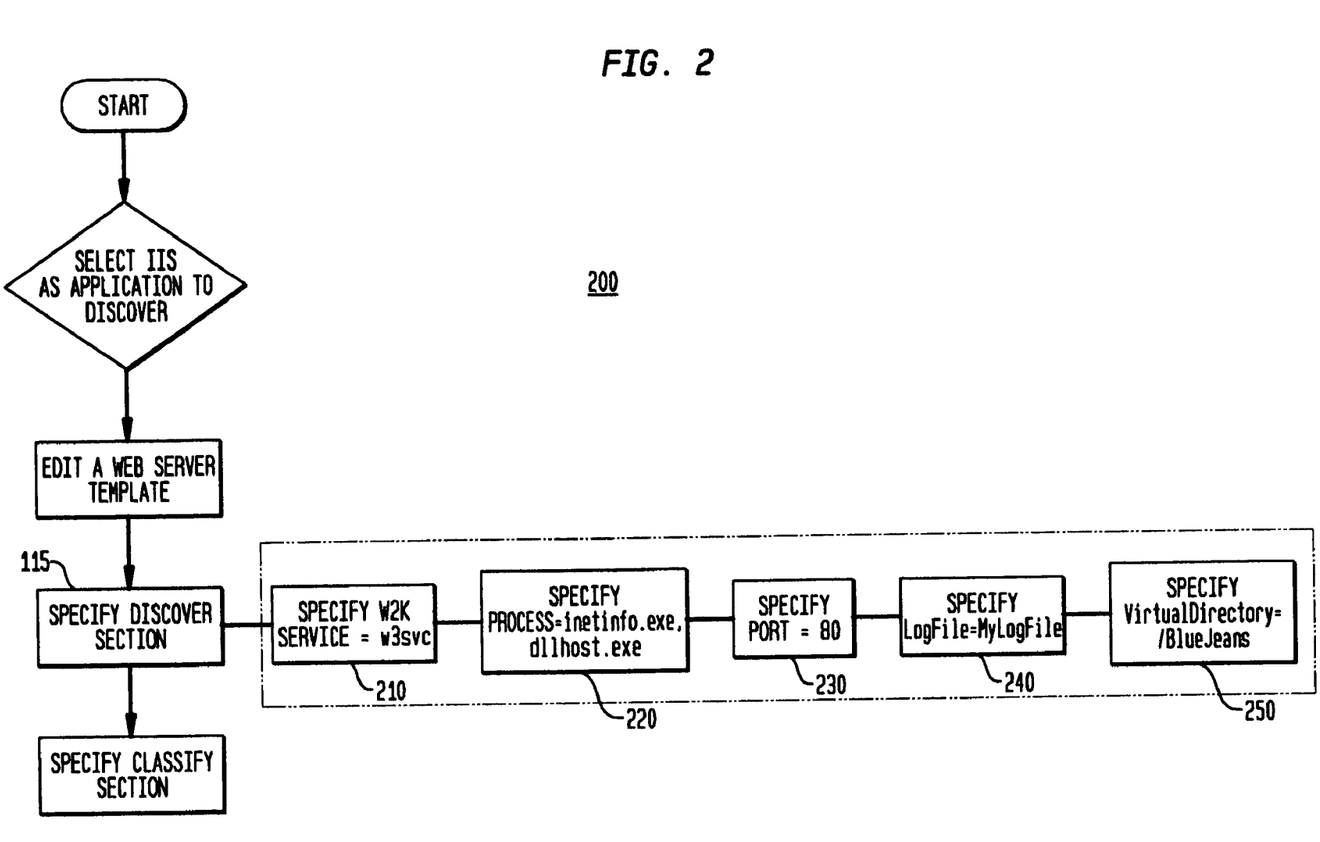
FIG. 2 illustrates a flow chart of an exemplary process for specifying the Discovery section of an application signature in accordance with the principles of the invention.

FIG. 2 illustrates in more detail exemplary steps in creating the Discover Section of the Application Signature. Using the Microsoft Internet Information Servers (IIS) application as an example, the discovery section instructions or directives (block 115, FIG. 1) of the Application Signature may include 1) specify the application name, e.g. Windows 2000 Service (w3svc) to be matched, block 210;

2) specify that processes to be matched; e.g., inetinfo.exe and dllhost.exe, block 220;

3) specify the port to be matched, e.g., port 80, block 230;

4) specify the Logfile, e.g., MyLogfile, block 240; and 5) specify the name of the Virtual directory (DocRoot) file; block 250.

Figure 3:
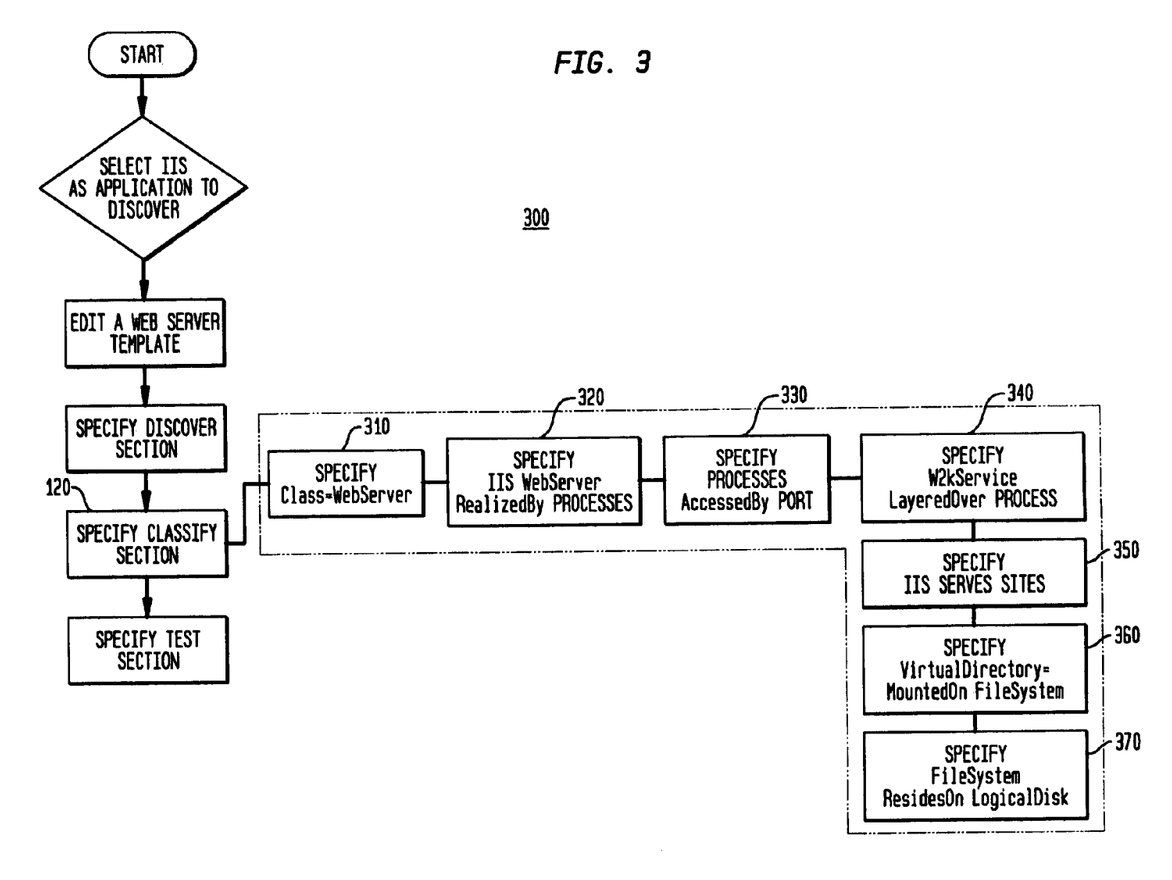
FIG. 3 illustrates a flow chart of an exemplary process for classifying a relationship among processes associated with an application signature in accordance with the principles of the invention.

FIG. 3 illustrates, in more detail, exemplary steps in creating the Classify Section (block 120, FIG. 1) instructions or directives of an Application Signature:

1) specify that the class of the application may be an instance of the class, e.g., IIS-WebServer, block 310;

2) The IIS-WebServer may have a RealizedBy relationship with the operating system processes, e.g., inetinfo.exe and dllhost.exe, block 320;

3) The IIS-WebServer has an AccessedBy relationship with port, e.g., 80, block 330;

4) An instance of the W2K Service class may be created and it may have a LayeredOver relationship with the processes, e.g., inetinfo.exe and dllhost.exe, block 340;

5) Instances of the web sites discovered within the Web Server may be created with a LayeredOver relationship to the Web Server (a representation of which may also be created), block 350;

6) The discovered Virtual directories for each Web Site may be created with a MountedOn relationship to the operating systems disk file system (a representation of which may also be created), block 360; and 7) The operating system's file system should have a ResidesOn relationship to the operating system's logical disk (a representation of which may also be created); block 370.

Figure 4:
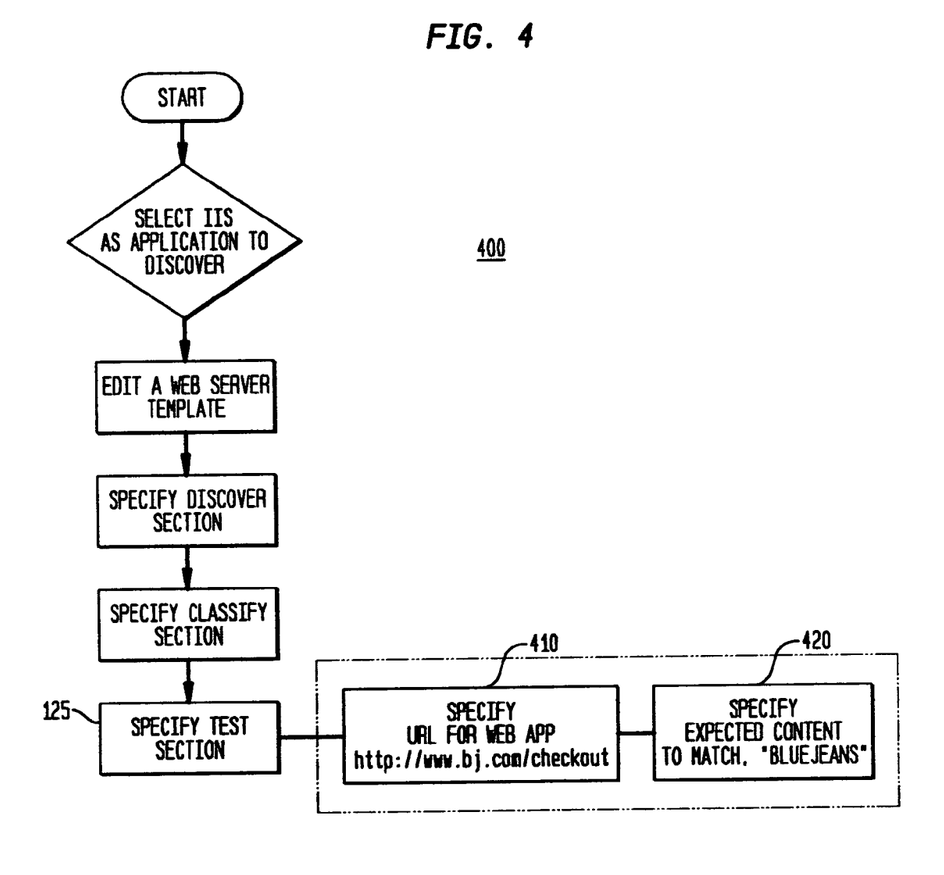
FIG. 4 illustrates a flow chart of an exemplary process for specifying how testing the relationships among processes associated with an application signature would function in accordance with the principles of the invention.

FIG. 4 illustrates in more detail exemplary steps for creating a test section (block 125, FIG. 1) instructions or directions of the Application Signature:

1) URL for a web applications may be entered. For example, in a retail situation wherein bluejeans are sold, a URL may be expressed as http://www.bluejeans.com/BrowseCat.asp in order to be certain that it returned the correct content, e.g., the string "BlueJeans", block 410;

2) This URL may then form the core of a synthetic transaction that is issued according to the Test statement in Application Signature to test if the topology (IIS and its many components) are still there and how rapidly each IIS Web Site responds to a query; (the URL may be issued periodically); and 3) When the synthetic transactions are issued, success criteria are deemed to be "true" when the transaction completes and it returns content containing the phrase, "BlueJeans".

Figure 5:
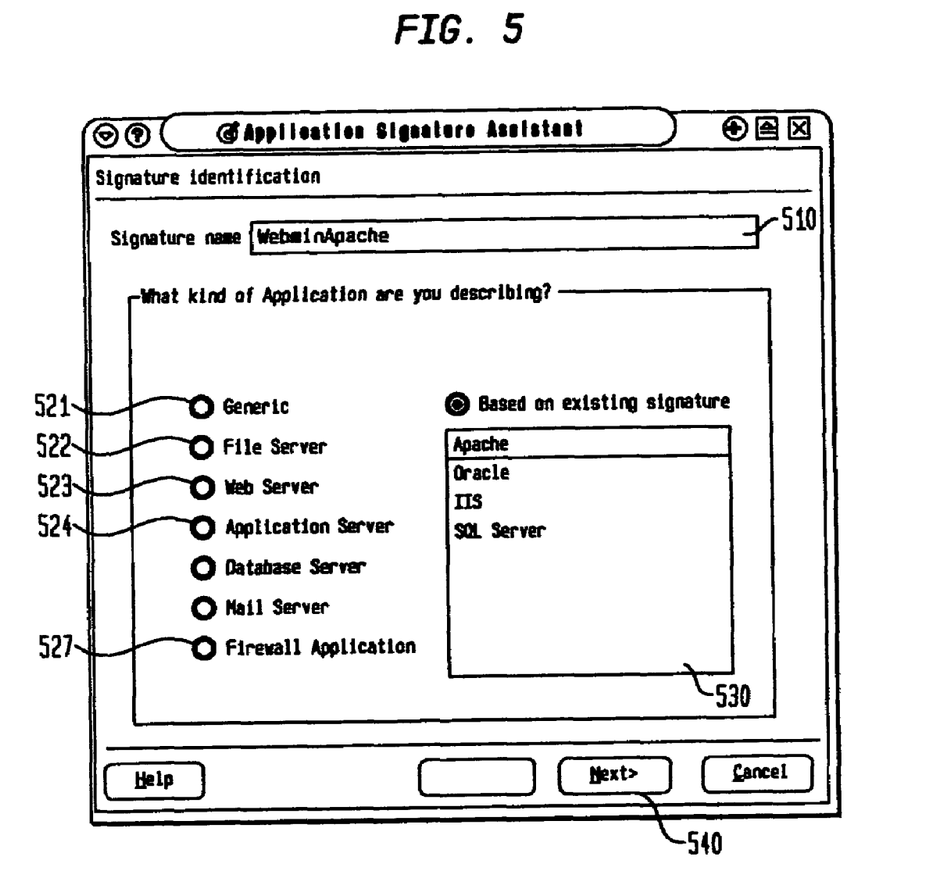
FIG. 5 illustrates an exemplary graphical user interface for accessing an application signature in accordance with the principles of the invention.

FIG. 5 illustrates an exemplary graphic user interface 500 to initiate a process of identifying or discovering application packages in accordance with the principles of the invention. In the exemplary interface shown, an application package name is entered into the space 510. A type of application package may then be specified by entering an indication in one of the open spaces, 521-527, associated with labels "Generic", "File Server", "Web Server", "Application Server," etc. The labels are associated with a class or type of application package, which are referred to as "well-known" architectures. In addition, a type of application package having known signatures may be selected by providing an indication in the open space 528 associated with the label "based on a predefined signature template." Providing an indication for selecting one of the types of application packages is well-known in the art and need not be described in detail herein.

When an indication is entered in one of the open spaces 520-527, or in open space 528, as is shown, a list of applications associated with the selected well-known architectures is displayed in box 530. In this illustrated case, software packages associated with known signatures are identified as "Apache," "Oracle," "IIS," and "SQL Server" and are displayed in space 530. One of the associated files may then be selected and the process continues by selecting the "next" box 540. Although only selected types of application packages or applications with known signatures are shown, it would be recognized by those skilled in the art, the number of types of application packages or the number of software packages having known signatures may be altered without changing the scope of the invention.

Figure 6:
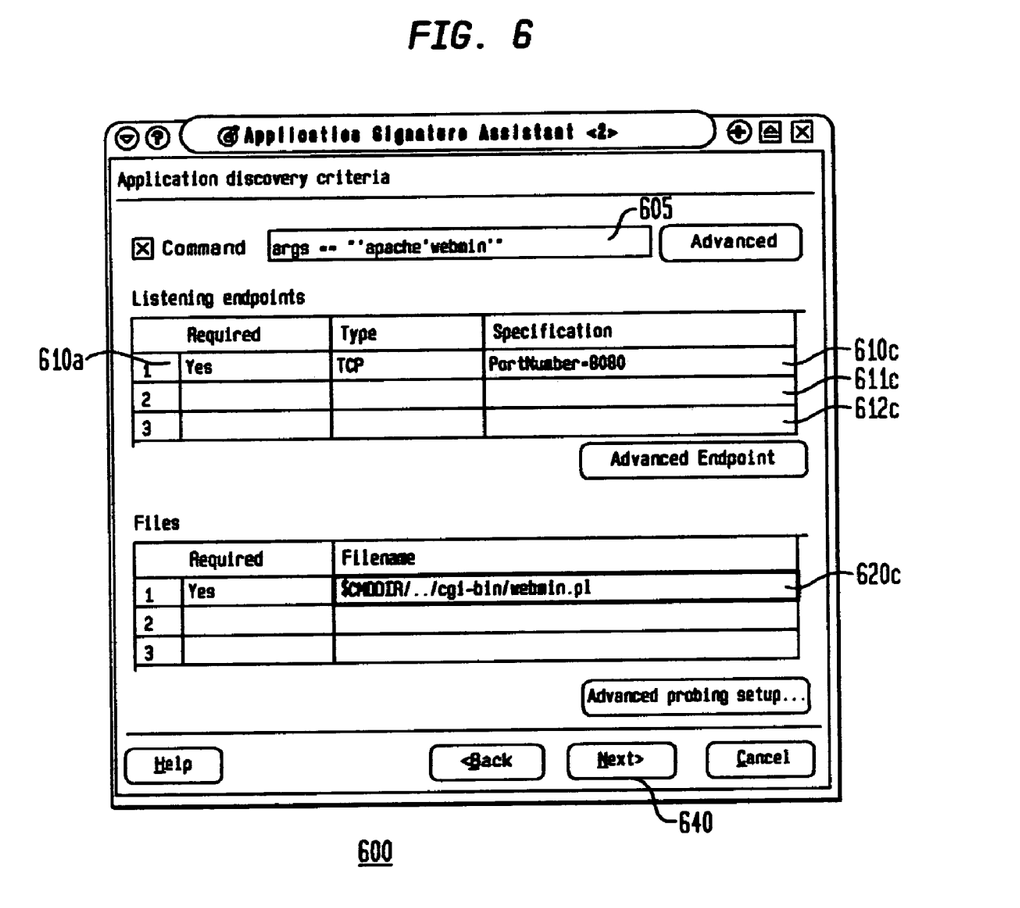
FIG. 6 illustrates an exemplary graphical user interface for specifying search properties of an application signature in accordance with the principles of the invention.

FIG. 6 illustrates an exemplary graphic user interface 600 that is displayed when the "next" box 540 (FIG. 5) is selected. In this exemplary interface, designated properties of the application packages of an Apache software package are displayed in spaces 610c-612c and the signature is identified via matching-criteria an Apache Webserver with the instance name of *Webmin (the * is a wildcard for matching names— in this case names that end in Webmin) in box 605. In this case, the PortNumber property, i.e., PortNumber=8080, associated with application package "Apache*Webmin" is displayed and is selected as a search criteria by positively indicating that it is required in box 610a. In addition, a file name, associated with matching the identified application is shown in box 620c. The application will not be deemed "found" unless this file is discovered as well as the aforementioned TCP port.

Figure 7:
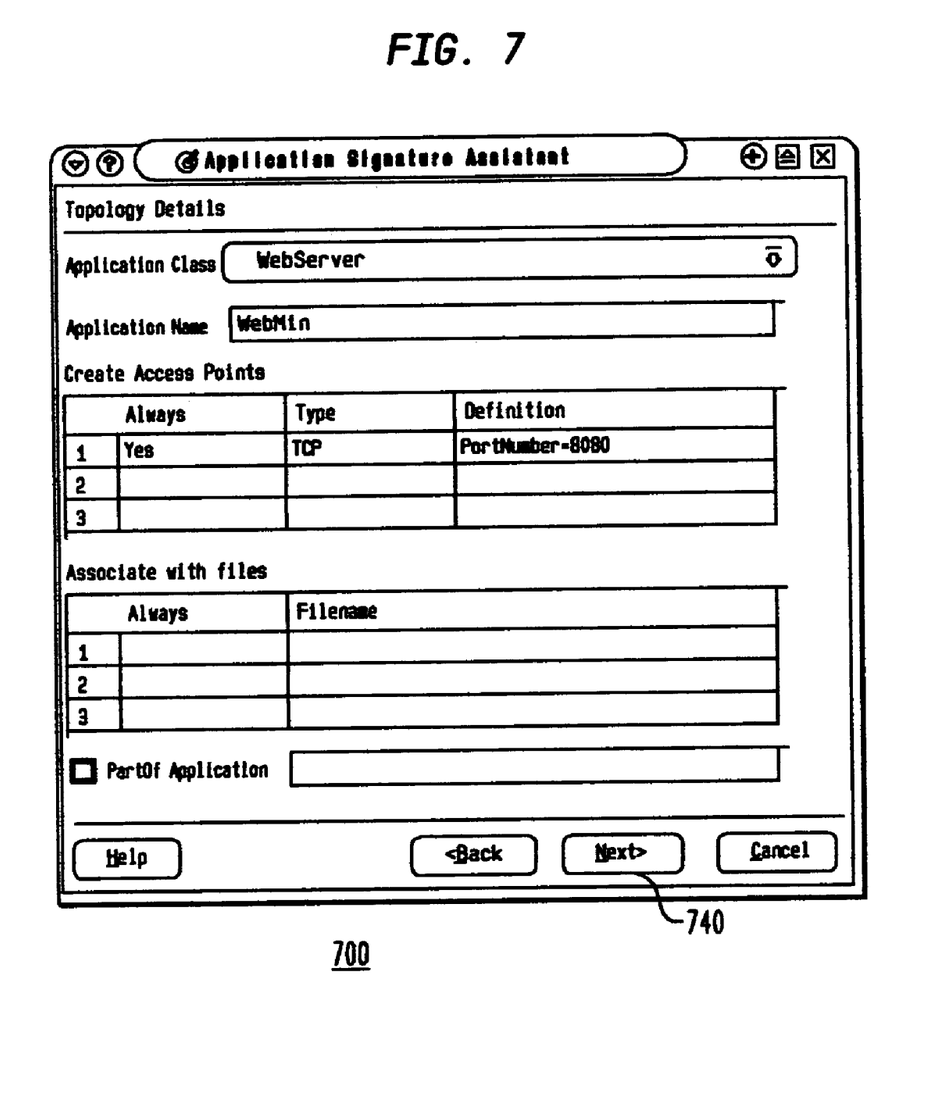
FIG. 7 illustrates an exemplary graphical user interface for specifying topology properties of an application signature in accordance with the principles of the invention.

FIG. 7 illustrates an exemplary graphic user interface 700 that is displayed when the "next" box 640 (FIG. 6) is selected. In this exemplary process, a topology of the application signature may be identified. FIG. 7 illustrates three features: designation of TCP/IP port assigned to the application, whether there are files that should be associated with the discovered processes and whether the discovered application is "part of" a larger application structure. Specifying port numbers is predicated on the knowledge that today most business networks use TCP/IP as their network protocol. Specifying a port for the application is another aspect of the "signature" that describes specifically which port this application communicates with using the TCP/IP protocol. Specifying the files is two-fold in purpose. First, specification of the files is a part of the signature that can differentiate the release versions of a software package during discovery. Second, a relationship between the discovered processes and the files will need to be created in the instantiation of the data model that is populated when a successful discovery occurs. Though not "filled-in" in this example, the designation "part of" describes a relationship the discovered application could have with a larger application service that has many parts, of which this application could be one.

Application signatures, in accordance with the principles of the present invention, may include selected elements or attributes such as: Application Name, Class Name (in ICIM, the InCharge data model), Instance Name, Vendor Product Name, Description, Major Version, Minor Version, Process name(s), PID, Command Line, Service name (if the operating system is the Windows 2000 or Windows 2003, which are well-known operating systems of the Mircosoft Corporation, Redmond, Wash., USA), File(s) used, TCP Port Number(s), and a specific Test to verify the application's existence and to monitor its availability. In one aspect the test may be specified as what is referred to as a "synthetic transaction" that may be expressed as a URL string that is executed, a SQL query, an API call such as JMX or WBEM or a test to open a specific port.

Figure 8A:
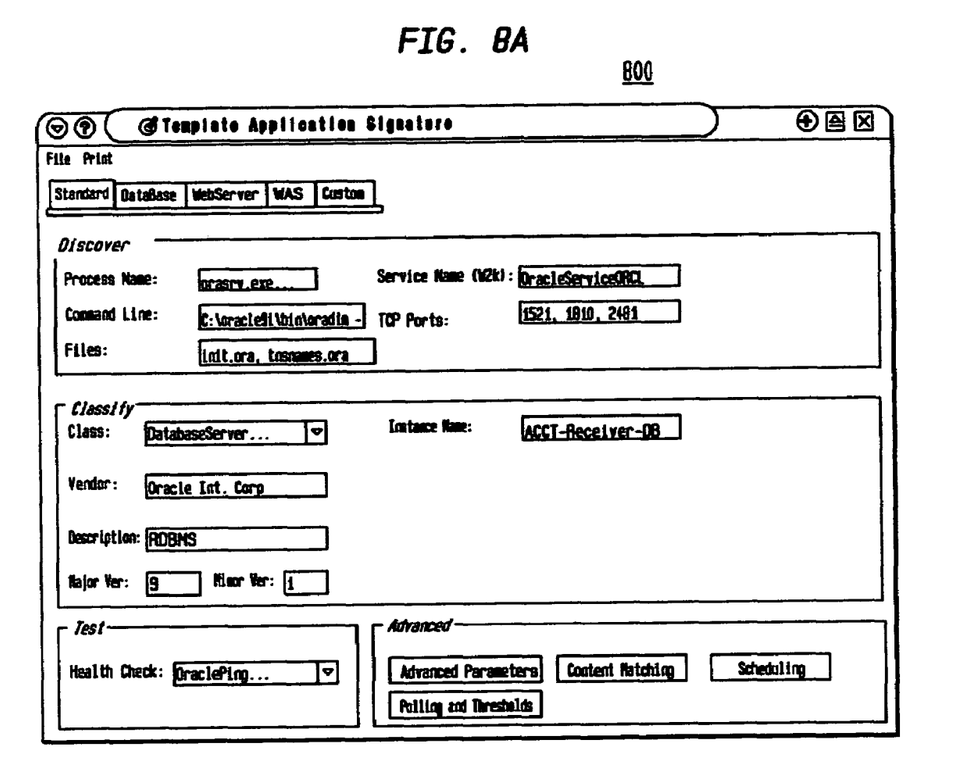
FIG. 8A illustrates a user-interface for creating a specific instance of an application signature.

FIG. 8A illustrates an exemplary application signature user interface for the application package referred to as ORACLE. ORACLE is a registered trademark of the ORACLE International Corporation having a principle place of business at 500 Oracle Parkway, Redwood City, Calif., 94065, USA. In this exemplary interface, the application name is referred to a Oracle and it is of the Class database server. The Instance name is ACCT-Receiver-DB and the product name is Oracle 9i RDBMS (relational database management system). The application is described as an RDBMS and the Major and Minor versions are 9 and i, respectively. The ports are used to test whether a TCP/IP connection can be made to the remote application in order to test its current availability. In addition processes: ORASRV, PMON, listener, DBWR and LGWR are specified in order to further identify the application Oracle and to signify that once discovered they should be created in the resultant topology as instances of the class process and having a relationship of ComposedOf with the Oracle application instance. In addition files config.ora, tnsnames,ora, listener.ora and SQLnet.ora are specified so they will need to be "found" or discovered in order for the discover function to complete successfully.

Figure 8B:
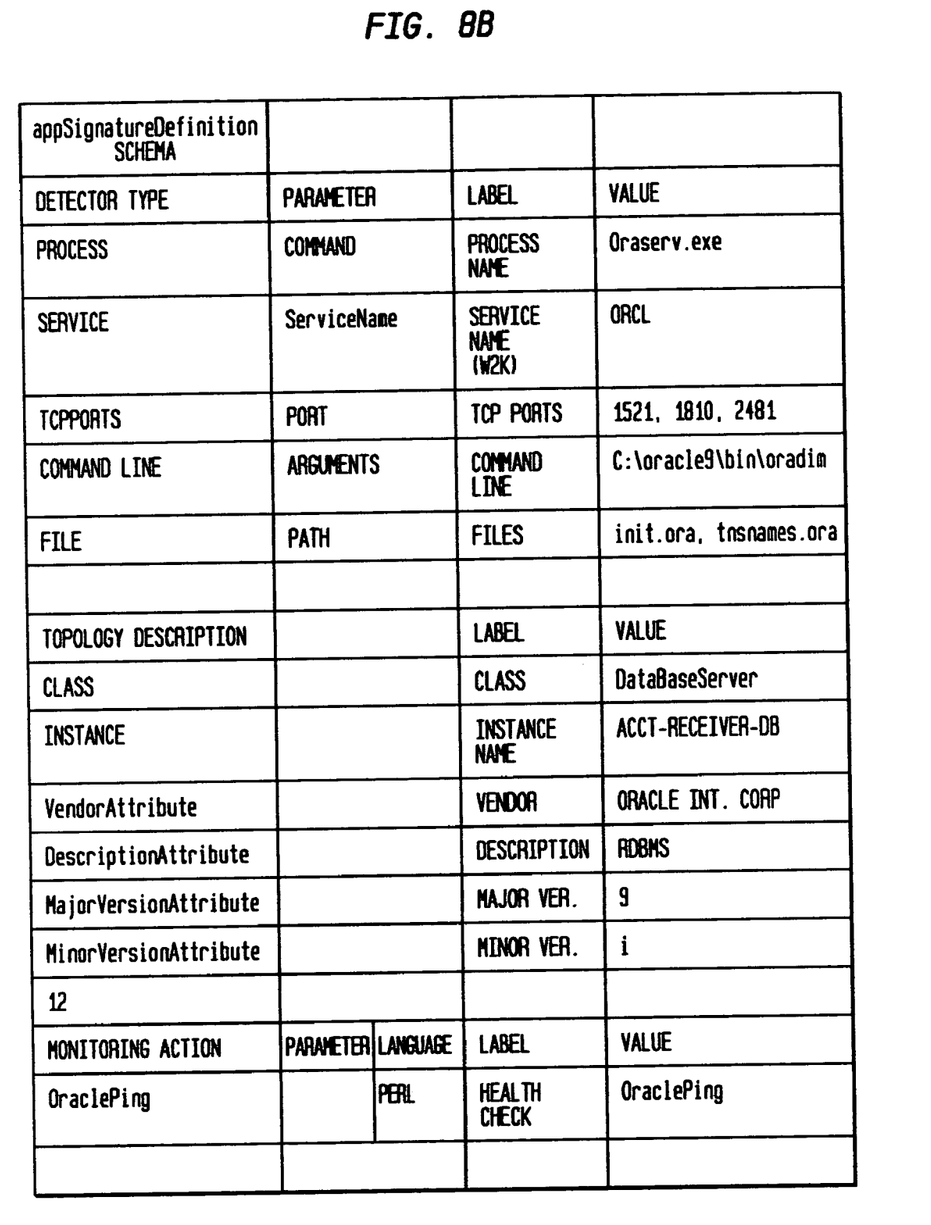
FIG. 8B illustrates an exemplary schema associated with the information shown in FIG. 8A.

FIG. 8B illustrates elements of an exemplary schema of an application signature, referred to as object ApplicationSignature, associated with the user-interface shown in FIG. 8A. In this illustrated case, the information is entered in the user-interface is persisted as an object; specifically as an instance of the object class ApplicationSignature. In the example illustrated, an instance of the class ApplicationSignature is created containing the information entered by the user to discover, classify and test (or monitor) the software application Oracle. The object class ApplicationSignature contains elements describing detector type (for discovery), topology description (for Classification) and Monitoring Action (for testing). The label column has been added to make it easier for the reader to relate this back to the user-interface screen shown in FIG. 8A:

1. Detector Type—The Detector type describes to a discovery probe what to look for when attempting to discover this application. The description may include or provide instruction or directives for the operation of the discovery probe(s);

2. Topology Description—The Topology Description is used to describe what topology would be created in a repository once discovery completes successfully. The description may include or provide instruction or directives for how the topology may be formulated or organized; and 3. Monitoring Action—the Monitoring Action is used to describe how to test that the application topology discovered is still available and what a reasonable response time would be for this application to respond to a test request. The description may include or provide instruction or directives for the operation of the specified action.

In one aspect of the invention, the files may be utilized to identify the Oracle application when it is not currently running. In this case, an Application Signature can specify both processes and files. If the application is not currently running, then the processes will not be active and, thus, not found. However, if a sufficient number of the files are located, then the application can be deemed to be "discovered, but not running."

The Test procedure employs a monitoring action, in this case referred to as OraclePing, which executes a test that the identified application package is operating correctly. In this case, the test is implemented by utilizing a previously created DB stored procedure.

Figure 9:
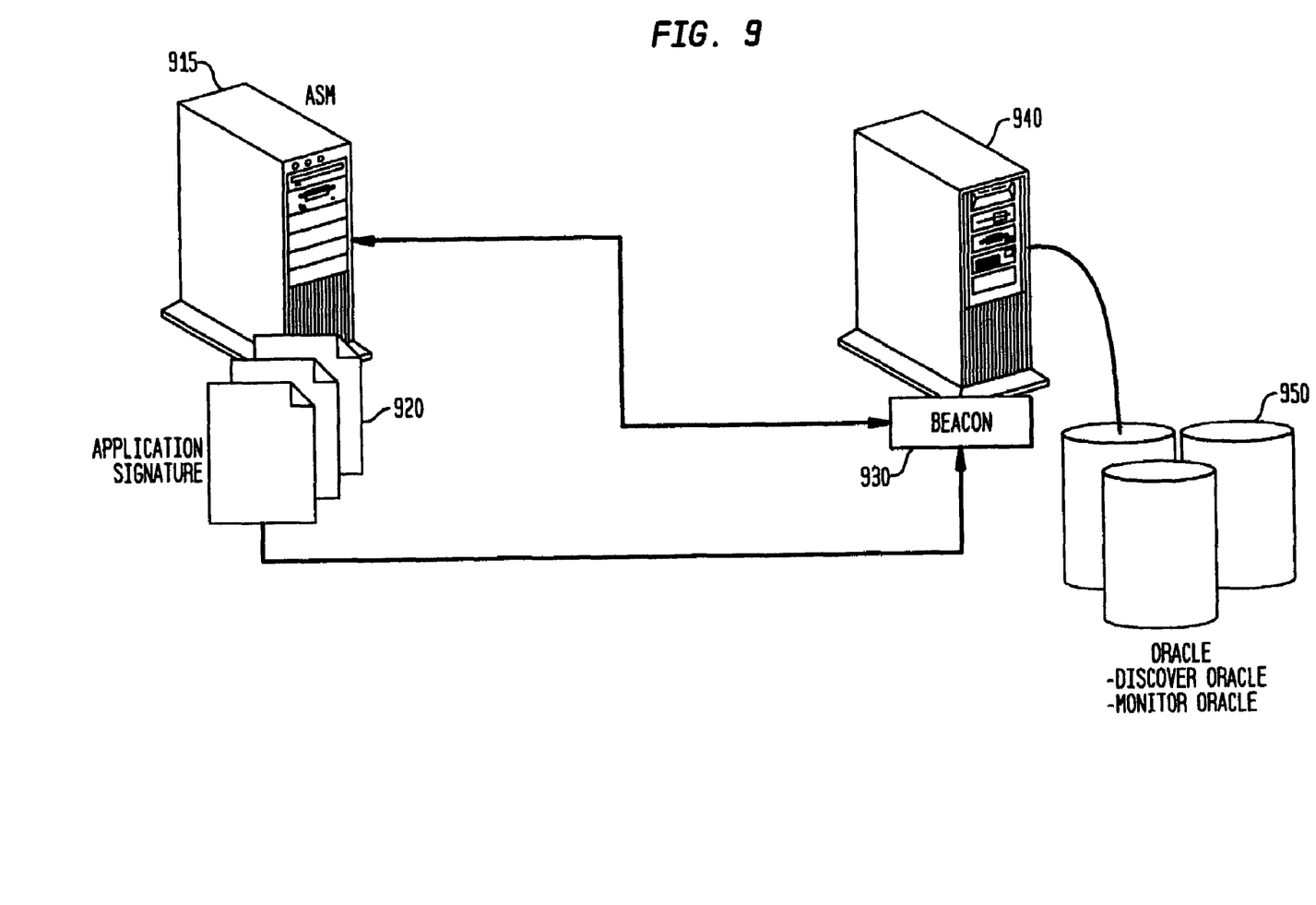
FIG. 9 illustrates exemplary local implementation of the processes shown herein.

FIG. 9 illustrates one aspect of the invention, wherein the Application Signature is deployed in order to discover the topology of the RDBMS Oracle, for example. In this illustration the Beacon 930, upon which the Application Signature object 920 resides, is executed on the same physical host 940 as the monitored application, Oracle 950, i.e., locally located.

Figure 10:
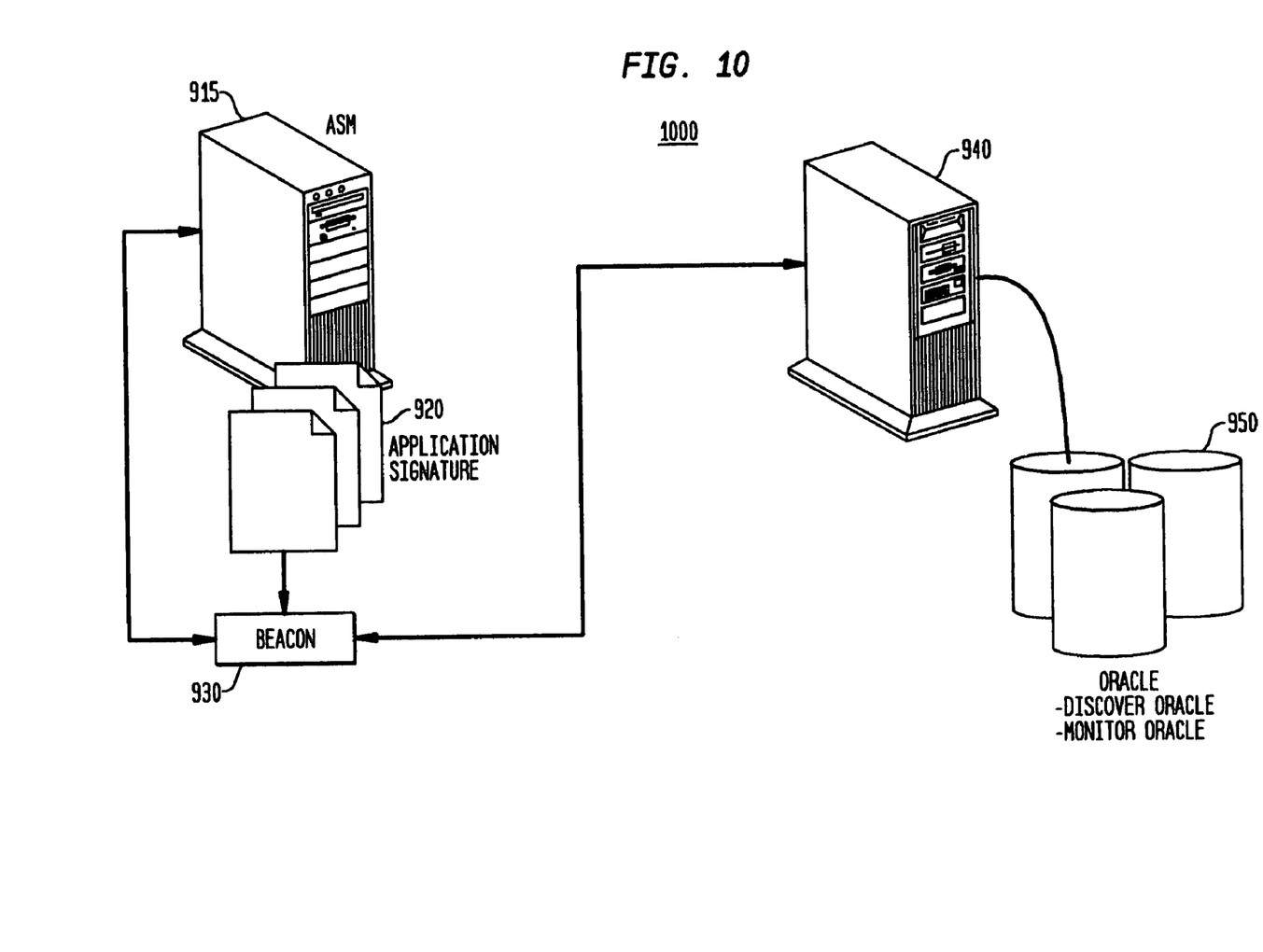
FIG. 10 illustrates exemplary remote implementation of the processes herein.

FIG. 10 illustrates a process similar to that shown in FIG. 9 except that the Beacon 930, of which the Application Signature object 920, is on a different physical server 915 than the monitored application, Oracle 950. Application Oracle 950 is thus referred as being remotely located. FIGS. 9 and 10, illustrate that the Application Signature is independent of location and achieves complete transparency with regard to where it is located in a network.

Figure 11:
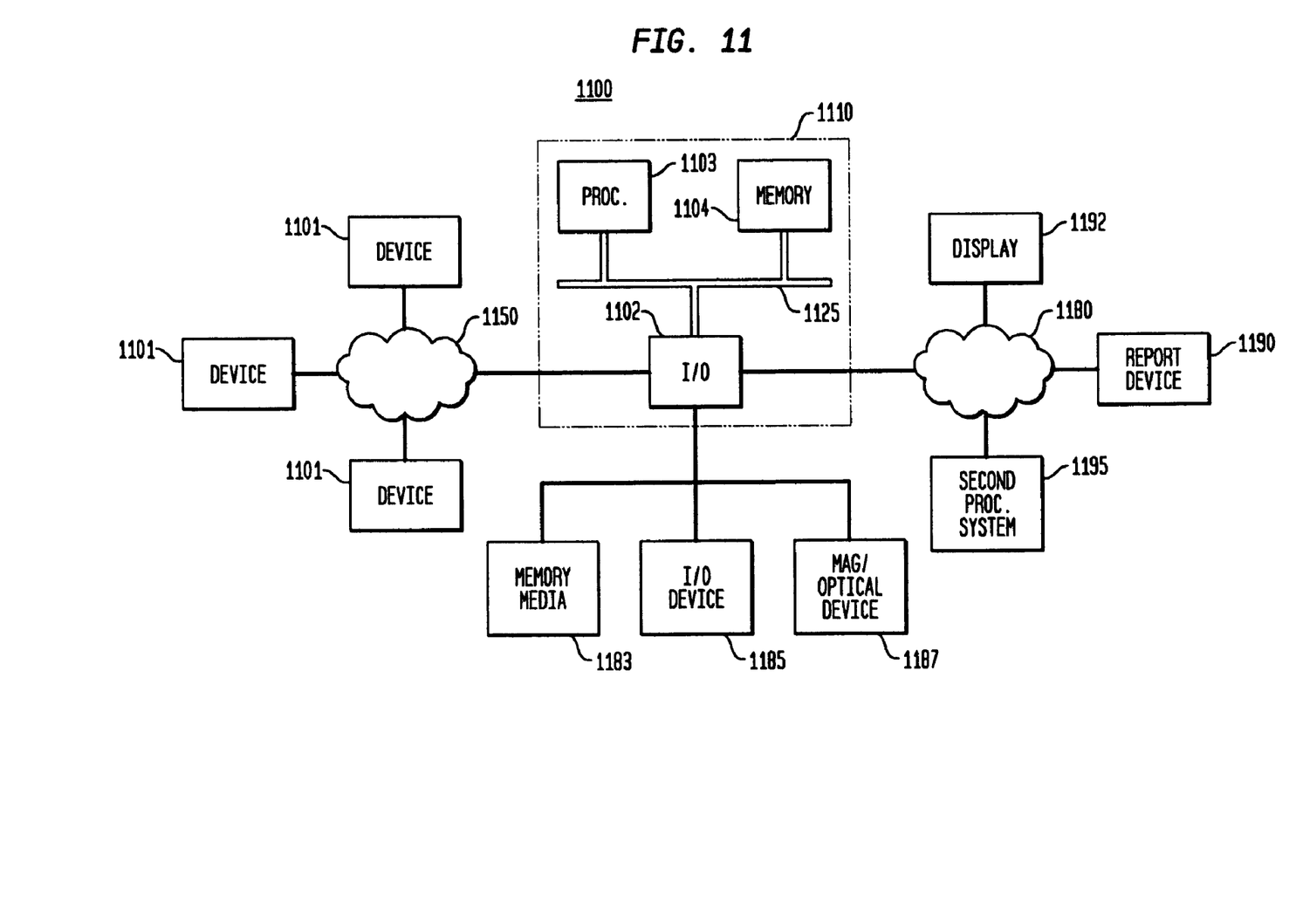
FIG. 11 illustrates a system for implementing the processes shown herein.

FIG. 11 illustrates an exemplary embodiment of a system 1100 that may be used for implementing the principles of the present invention. System 1100 includes processing unit 1110 that may contain one or more input/output devices 1102, processors 1103 and memories 1104. I/O devices 1102 may access or receive information from one or more sources or devices 1101. Sources or devices 1101 may be devices such as routers, servers, computers, notebook computer, PDAs, cells phones or other devices suitable for transmitting and receiving information responsive to the processes shown herein. Devices 1101 may have access over one or more network connections 1150 via, for example, a wireless wide area network, a wireless metropolitan area network, a wireless local area network, a terrestrial broadcast system (Radio, TV), a satellite network, a cell phone or a wireless telephone network, or similar wired public networks, such as POTS, INTERNET, LAN, WAN and/or private networks, e.g., INTRANET, as well as portions or combinations of these and other types of networks. Network 1150 may similarly represent a communication bus, such as PCI, USB, Firewire, etc.

Input/output devices 1102, processors 1103 and memories 1104 may communicate over a communication medium 1125. Communication medium 1125 may represent, for example, a bus, a communication network, one or more internal connections of a circuit, circuit card or other apparatus, as well as portions and combinations of these and other communication media. Input data from the devices 1101 is processed in accordance with one or more programs that may be stored in memories 1104 and executed by processors 1103. Processors 1103 may be any means, such as general purpose or special purpose computing system, such as a laptop computer, desktop computer, a server, handheld computer, or may be a hardware configuration, such as dedicated logic circuit, or integrated circuit. Processors 1103 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In a one aspect, the processes shown herein may be represented by computer readable code stored on a computer readable medium. The code may also be stored in the memory 1104. The code may be read/downloaded from a memory medium 1183, an I/O device 1185 or magnetic or optical media, such as a floppy disk, a CD-ROM or a DVD, 1187. Although not shown, it would be recognized that the code may be stored on a external device and downloaded via a network to processor 1103. The downloaded computer readable code may be stored in memory 1104 or executed directly by processor 1103. Further it would be understood that the code may be processor specific or processor non-specific. Code written in the Java programming language is an example of processor non-specific code. Java is a trademark of the Sun Microsystems Corporation.

Information from device 1101 received by I/O device 1102, after processing in accordance with one or more software programs operable to perform the functions illustrated herein, may also be transmitted over network 1180 to one or more output devices represented as display 1192, reporting device 1190, e.g., printer, or second processing system 1195. As one would recognize, networks 1125, 1150 and 1180 may be physically be the same network or may be different networks that operate on the same or different communication principles.

As one skilled in the art would recognize also that the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, USB, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to embodiments thereof it will be understood that various omissions and substitutions and changes in the apparatus described, in the form and details of the devices disclosed, and in their operation, may be made by those skilled in the art without departing from the spirit of the present invention. For example, while the flow charts depict a sequence of operating steps, this is shown for illustrative purposes only as the steps may be executed or performed in another sequence or order. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for specifying the identification and classification of at least one application having components distributed over selected nodes of a network system, said method comprising:

creating a network deployable application signature to enable remote discover and identification of an application when actualized or executed by a beacon;

creating a first section of the network deployable signature containing at least one directive for specifying information for initiating at least one external process; wherein the at least one directive, of the first section, when actualized or executed by the beacon discovers characteristics of the application;

creating a second section of the network deployable signature containing at least one directive for specifying information for initiating at least one external process; wherein the at least one directive, of the second section, when actualized or executed by the beacon stores the discovered characteristics; and creating a third section of the network deployable signature containing at least one directive for specifying information for initiating at least one external process; wherein the at least one directive, of the third section, when actualized or executed by the beacon tests the discovered characteristics.

2. The method as recited in claim 1, wherein the at least one directive in the first section are selected from the group consisting of: application name, instance name, processes to match, ports to match.

3. The method as recited in claim 2, wherein the directives in the first section further include the identification of locations for storing the discovered characteristics.

4. The method as recited in claim 1, wherein the at least one directive in the second section is selected from the group consisting of: class, vendor name, description, major version designation, and minor version designation.

5. The method as recite in claim 1, wherein the at least one directive in the third section is selected from the group consisting of: a synthetic transaction, a URL string, an SQL query, an API call, and a port test.

6. The method as recited in claim 1, wherein the at least one directive in the second section stores the discovered characteristics in the form of application maps (topology).

7. An apparatus for specifying the identification and classification of at least one application having components distributed over selected nodes of a network system, said apparatus comprising:
    a processor in communication with a memory, the processor executing code for:
        creating a network deployable application signature to enable remote discover and identification of an application when actualized by a beacon;
        creating a first section of the network deployable signature containing at least one directive for specifying information for initiating at least one external process; wherein the at least one directive, of the first section, when actualized or executed by the beacon discovers characteristics of said application;
        creating a second section of the network deployable signature containing at least one directive for specifying information for initiating at least one external process; wherein the at least one directive, of the second section, when actualized or executed by the beacon stores the discovered characteristics; and
        creating a third section of the network deployable signature containing at least one directive for specifying information for initiating at least one external process; wherein the at least one directive, of the third section, when actualized or executed by the beacon tests the discovered characteristics.

8. The apparatus as recited in claim 7, wherein the at least one directive in the first section are selected from the group consisting of: application name, instance name, processes to match, ports to match.

9. The apparatus as recited in claim 8, wherein the directives in the first section further include the identification of locations for storing the discovered characteristics.

10. The apparatus as recited in claim 7, wherein the at least one directive in the second section is selected from the group consisting of: class, vendor name, description, major version designation, and minor version designation.

11. The apparatus as recited in claim 7, wherein the at least one directive in the third section is selected from the group consisting of: a synthetic transaction, a URL string, an SQL query, an API call, and a port test.

12. The apparatus as recited in claim 7, further comprising:
    an input/output device in communication with the processor, the input/output device for providing selected ones of the directives to the processor and for transmitting information from the processor.

13. The apparatus as recited in claim 7, wherein the code is stored in the memory.

14. The apparatus as recited in claim 8, wherein the directives in the second section stores the discovered characteristics in the form of application maps (topology).

15. A computer-readable medium containing code thereon, the code suitable for specifying the identification and classification of at least one application having components distributed over selected nodes of a network system for providing instructions to a computing system for executing the steps of:
    creating a first section of the network deployable signature to enable remote discover and identification of an application when actualized or executed by a beacon: wherein the network deployable signature contains at least one directive for specifying information for initiating at least one external process; wherein the at least one directive, of the first section, when actualized by the beacon discovers characteristics of said application;
    creating a network deployable application signature;
    creating a second section of the network deployable signature containing at least one directive for specifying information for initiating at least one external process; wherein the at least one directive, of the second section, when actualized or executed by the beacon stores the discovered characteristics; and
    creating a third section of the network deployable signature containing at least one directive for specifying information for initiating at least one external process: wherein the at least one directive, of the third section, when actualized or executed by the beacon tests the discovered characteristics.

16. The computer-readable medium as recited in claim 15, wherein the at least one directive in the first section are selected from the group consisting of: application name, instance name, processes to match, ports to match.

17. The computer-readable medium as recited in claim 16, wherein the directives in the first section further include the identification of locations for storing the discovered characteristics.

18. The computer-readable medium as recited in claim 15, wherein the at least one directive in the second section is selected from the group consisting of class: vendor name, description, major version designation, and minor version designation.

19. The computer-readable medium as recite in claim 15, wherein the at least one directive in the third section is selected from the group consisting of: a synthetic transaction, a URL string, an SQL query, an API call, and a port test.

20. The computer-readable medium as recited in claim 15, wherein said medium is selected from the group consisting of: magnetic media, and optical media.

* * * * *